May 7, 1929.  A. C. GRUNWALD  1,712,208
MOTOR VEHICLE TEMPERATURE INDICATING DEVICE
Filed Nov. 12, 1925
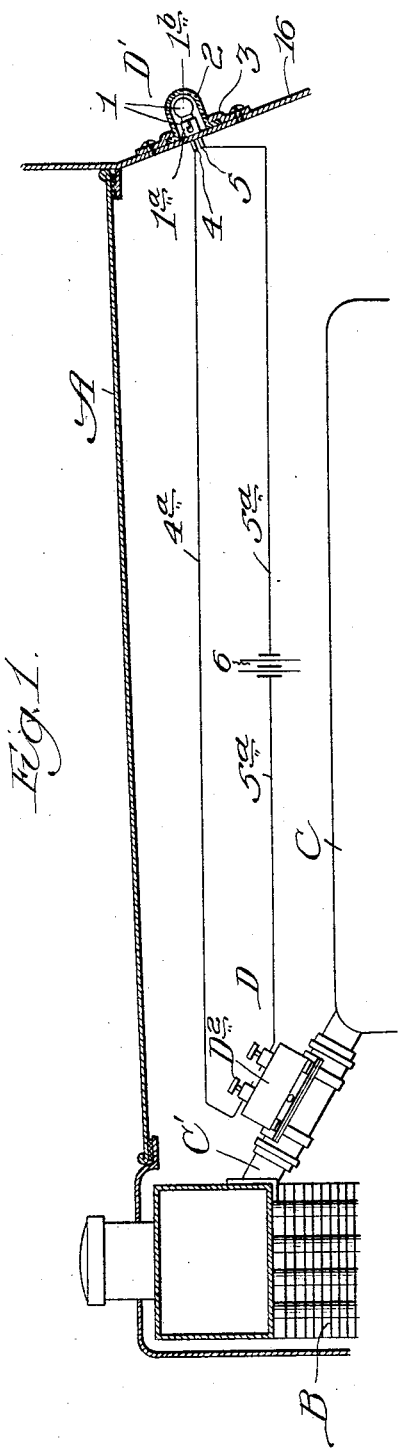
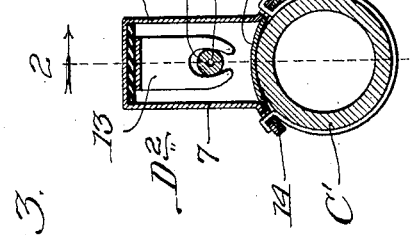
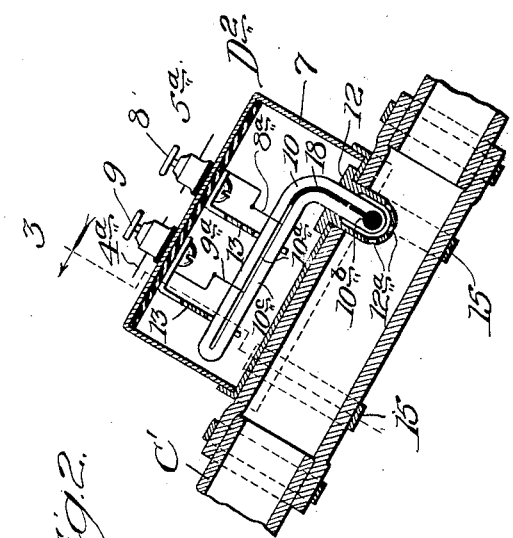
Inventor:
Albert C. Grunwald,
By Dyrenforth, Lee, Chritton & Wiles,
Attys.

Patented May 7, 1929.

1,712,208

UNITED STATES PATENT OFFICE.

ALBERT C. GRUNWALD, OF RIVER FOREST, ILLINOIS, ASSIGNOR TO PRECISION METAL WORKERS, OF CHICAGO, ILLINOIS, A CORPORATION OF ILLINOIS.

MOTOR-VEHICLE TEMPERATURE-INDICATING DEVICE.

Application filed November 12, 1925. Serial No. 68,630.

This invention relates particularly to a device for indicating a dangerous rise in temperature in an automobile engine.

The primary object of the invention is to provide a device which will operate with certainty to prominently display a signal in the event of a dangerous rise in temperature in a motor-vehicle engine of the internal combustion type.

The present invention constitutes a modification of the invention disclosed in my application, Serial No. 60,324, filed October 3, 1925.

The present invention is illustrated in its preferred embodiment in the accompanying drawing, in which—

Fig. 1 represents a broken sectional view of the front portion of the motor-vehicle equipped with my improved danger-indicating device; Fig. 2 is a broken sectional view on an enlarged scale showing a circuit-controlling device employed; and Fig. 3 is a transverse sectional view taken as indicated at line 3 of Fig. 2.

In the illustration given, A designates the cowl, or hood, of a motor-vehicle; B, the radiator of the cooling sysetm; C, the water-jacket of the engine block which communicates through a hose C' with the upper portion of the radiator; and D, a danger-indicating device which comprises a signal device D' mounted on the automobile dash, for example, and a circuit-closing device $D^2$ applied to the hose C' of the water-cooling system.

The radiator B may be of any approved type, and the engine (indicated at C) may be any internal combustion engine. As is known, the water of the cooling system circulates from the water-jacket of the engine to the upper portion of the radiator and back from the lower portion of the radiator to the lower portion of the water-jacket, a pump being employed, if desired, to promote the circulation.

The signal device D', which may conveniently be mounted on the instrument board, or dash, of an automobile, preferably comprises a signal lamp 1 and a glass housing 2. The lamp is mounted in a suitable perforation in the dash; and the glass housing 2, which has its base portion externally flanged, is secured to the dash by means of a clip 3.

In the illustration given, the lamp is provided with terminals 4 and 5 connected with conductors $4^a$ and $5^a$, a battery 6 being interposed in the course of the conductor $5^a$. It will be understood that the circuit is diagrammatic. In practice, the battery may be the usual ignition and lighting battery of the automobile, if desired; also, in practice, one line of the circuit may be furnished by the frame of the automobile, in which case, one terminal of the lamp will be grounded on the frame of the automobile.

The circuit-controlling device $D^2$ preferably comprises a casing 7 mounted on the hose C' and having insulated contacts 8 and 9 mounted thereon; and a thermometer-like device 10 housed by the casing 7. The device 10 comprises a glass tube having a bore $10^a$; and a mercury column 18 contained in the tube. The tube preferably is of elbow-shape, having a bulb portion $10^b$ and having also a portion $10^c$ which is disposed parallel with the hose. The bulb is held by a packing gland 12 which extends through a perforation in the upper wall of the hose. The lower portion of the gland may be provided with perforations $12^a$ to permit the water to reach the glass bulb. This is the preferred arrangement, but it may be observed that it is unnecessary to have the bulb extend into the passage of the hose. That is, by suitably calibrating the instrument, the degree of heat transmitted to the mercury will suffice to expand the mercury and close the circuit even though the thermometer-like device is disposed wholly outside of the hose. However, it is preferred to use the arrangement illustrated.

The tube $10^c$ is shown supported by brackets 13 which depend from the upper wall of the casing 7. The contacts 8 and 9 are connected with conductors $8^a$ and $9^a$ which extend through the upper wall of the glass tube and into the bore, or passage $10^a$, these wires being sealed in the glass and separated from each other by a suitable space.

In the illustration given, the casing, or mounting, 7 comprises an upper casing section $7^a$ and a base section $7^b$. The base section is curved to conform to the hose upon which the device rests, and the casing-parts are provided with lateral flanges 14 having slots, or perforations, therethrough which receive the ends of metal straps 15, which serve to bind the housing to the hose. The end portions of the metal straps extend through the perforations and are clenched upon the flanges 14.

The glass housing 2 may, if desired, be composed of colored glass. For example, the glass may have a red color.

By reference to Fig. 2, it will be observed that the circuit of the lamp 1 is ready to be closed at any time when the heat imparted to the thermometer-like device is sufficient to cause such expansion of the mercury as to bridge the space between the terminals 8ª and 9ª. It is preferred to so calibrate the device so that the circuit will be closed when the water passing through the hose C' reaches a temperature in the neighborhood of 200° F. When this occurs, the lamp 1 is automatically lighted, and a warning light is thus displayed through the glass housing 2 which is immediately under the eyes of the driver. Thus, the device provides a warning signal which cannot be overlooked by the driver of the automobile.

From the description given, it will be understood that the improved device is adapted to display prominently a danger signal which is close to the driver. This occurs when the cooling fluid of the engine reaches a predetermined temperature, the cooling fluid, in turn, being heated by the engine.

In the illustration given, the circuit-closer D² is operated by the heat of the water circulating through the hose C', that is, by the water immediately after it leaves the upper portion of the jacket of the engine, which probably is the hottest point in the system. This is the preferred arrangement, but the circuit-closer may be actuated by the heat of any fluid which is heated by the engine. However, the hose C' is readily accessible, and the circuit-closer is readily applied thereto.

The electric lamp 1 comprises an electric connector 1ª mounted in the dash, or instrument plate, 16, and an electric bulb 1ᵇ mounted in said connector. Any desired type of connector may be employed.

What I regard as new, and desire to secure by Letters Patent, is:

1. In combination with a hose adapted for connecting the cooling-jacket of an engine with a radiator, a circuit-closer comprising a mounting equipped with attaching means embracing said hose, a thermometer tube having a bulb supported in contact with the liquid in said hose in said housing provided with a mercury column and with spaced contacts adapted to be bridged by the mercury, and terminals carried by said mounting and electrically connected with said contacts.

2. A circuit-closer for the purpose set forth, comprising a housing equipped with binding posts and equipped with a gland adapted to extend through an opening in a hose, means for clamping said housing on a hose, a thermometer tube mounted in said housing and having a bulb extending into said gland, and spaced contacts extending through a wall of said thermometer and connected with said binding posts.

3. A circuit-closer for the purpose set forth, comprising a housing and a thermometer tube mounted therein, said housing comprising a bottom member equipped with means for attaching it to a hose and equipped with a gland adapted to extend through a perforation in the hose, the bulb of said thermometer tube extending into said gland, said thermometer tube being equipped with contacts and said housing being equipped with binding posts connected with said contacts.

4. A circuit-closer adapted to be applied to a hose leading from an engine, said circuit-closer comprising a housing having a curved bottom wall conforming to the hose and equipped with a gland adapted to extend through a hole in the hose, a thermometer mounted in said housing and having a bulb housed in said gland, said thermometer being provided with spaced contacts adapted to be bridged by the mercury in the thermometer, means for securing said housing to the hose, and terminals mounted on said housing and electrically connected with said contacts.

5. A circuit-closer adapted to be applied to a hose, said circuit-closer comprising a housing equipped with a separable bottom plate, straps adapted to secure said housing upon the hose, a gland mounted in the bottom plate of the housing and adapted to extend through a perforation in the hose, an angular thermometer tube mounted in said housing and having a bulb housed by said gland, said thermometer tube being equipped with contacts adapted to be bridged by mercury in the thermometer tube, and terminals mounted on the main portion of the housing and electrically connected with said contacts.

ALBERT C. GRUNWALD.